Jan. 17, 1956 A. W. VINCENT 2,731,516

COORDINATE ELECTRICAL SWITCHING MEANS

Filed Dec. 14, 1951 4 Sheets-Sheet 1

INVENTOR.
ANDREW W. VINCENT

BY D. Clyde Jones

ATTORNEY

Jan. 17, 1956 A. W. VINCENT 2,731,516

COORDINATE ELECTRICAL SWITCHING MEANS

Filed Dec. 14, 1951 4 Sheets-Sheet 2

INVENTOR.
ANDREW W. VINCENT
BY D. Clyde Jones
ATTORNEY

Jan. 17, 1956 A. W. VINCENT 2,731,516

COORDINATE ELECTRICAL SWITCHING MEANS

Filed Dec. 14, 1951 4 Sheets-Sheet 3

INVENTOR.
ANDREW W. VINCENT

BY D. Clyde Jones
ATTORNEY

Jan. 17, 1956 A. W. VINCENT 2,731,516

COORDINATE ELECTRICAL SWITCHING MEANS

Filed Dec. 14, 1951 4 Sheets-Sheet 4

INVENTOR.
ANDREW W. VINCENT
BY D. Clyde Jones
ATTORNEY 2,731,516

COORDINATE ELECTRICAL SWITCHING MEANS

Andrew W. Vincent, Rochester, N. Y.

Application December 14, 1951, Serial No. 261,673
22 Claims. (Cl. 179—27.54)

This invention relates to a coordinate switch suitable for interconnecting telephone lines, radio and television circuits, and the like.

The main feature of the present invention relates to the production of an interconnecting switch of small size, designed for unit construction of sub-assemblies which are later assembled into a complete switch.

Another feature of this invention relates to the production of an interconnecting switch in which the contacts have no spring "preform" as in the case of relays, whereby the assembling and adjustment of the switch is greatly facilitated.

Still another feature of the invention relates to the production of a coordinate type of switch in which the capacitance or electrical capacity effects between the contact members is reduced to such a low value that the switch is especially adapted for interconnecting radio and television circuits or networks.

Other features and advantages of the invention will appear from the detailed description and claims when taken with the drawings in which:

Figures 4, 5:
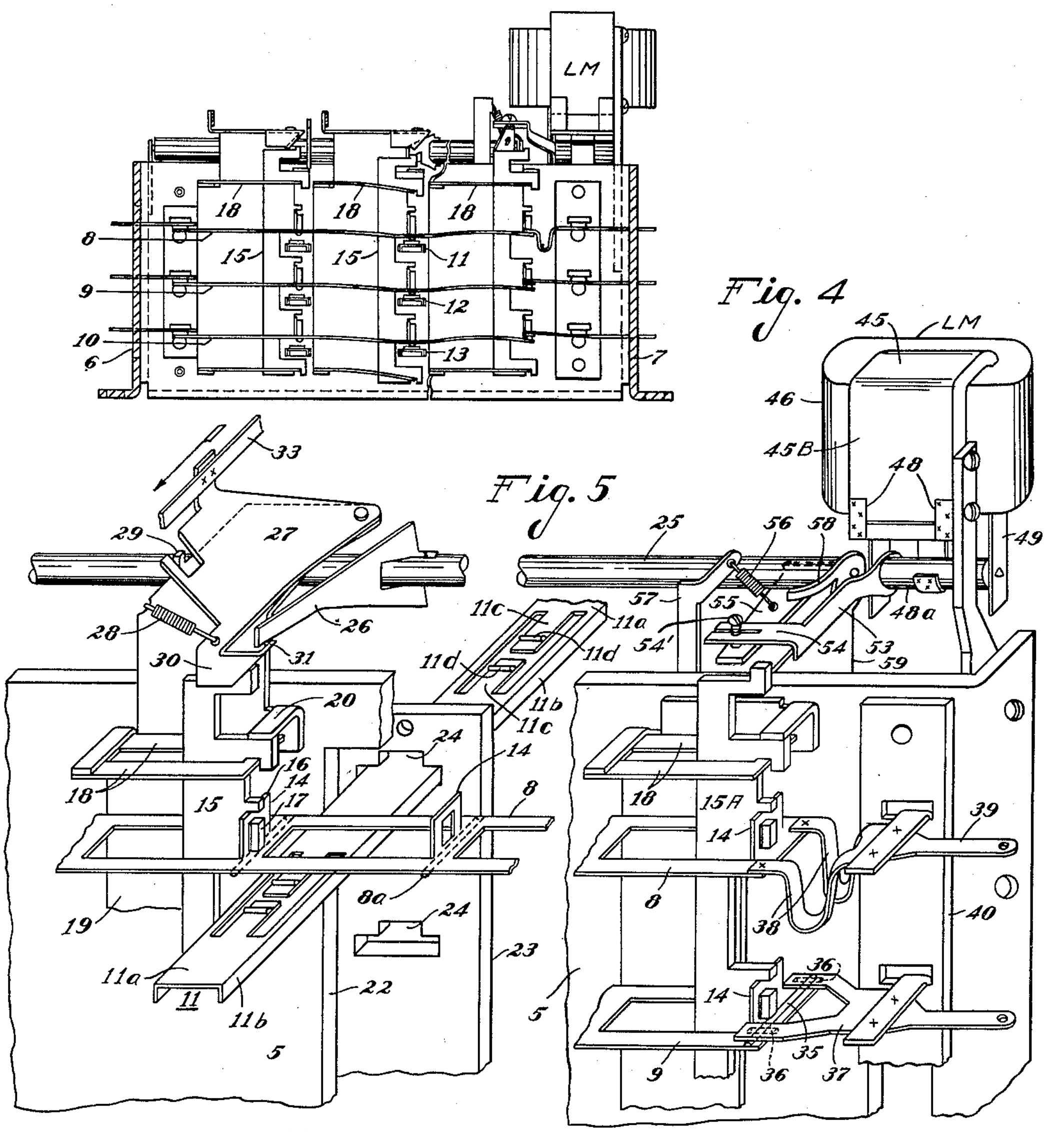
Fig. 4 is a sectional view of the switch taken on the line 4—4 of Fig. 1.
Figure 6:
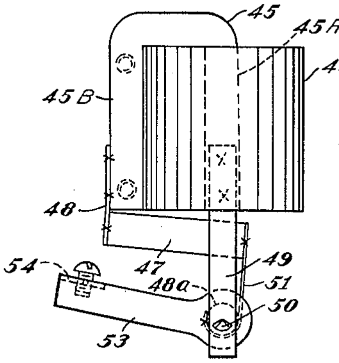
Figure 7:
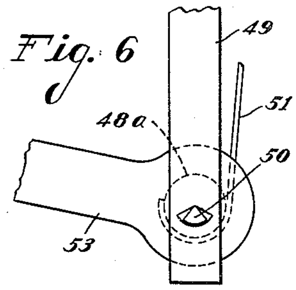

Fig. 5 is a fragmentary isometric drawing illustrating a connecting bar and a connecting strip together with an actuator and related means for depressing connecting strips into engagement with the contacts of connecting bars at the cross-over point thereof as well as mechanism for disconnecting certain of the connection strips from their call initiating equipment and other related mechanism after the initiation of a call;

Fig. 6 is a side view of an operating magnet suitable for use in the switch;

Fig. 7 is an enlarged detailed view of a portion of the operating magnet.

Figure 11:
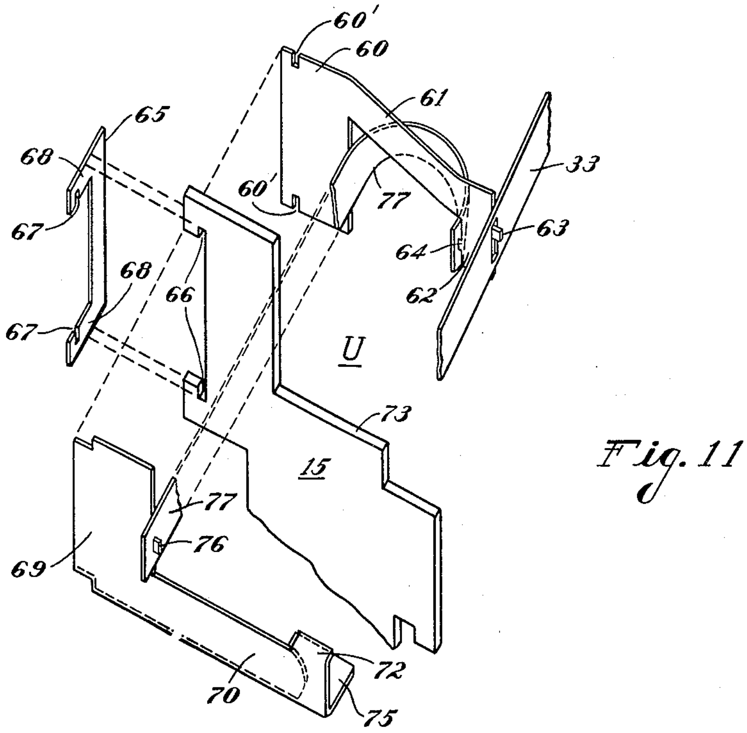
Figure 8:
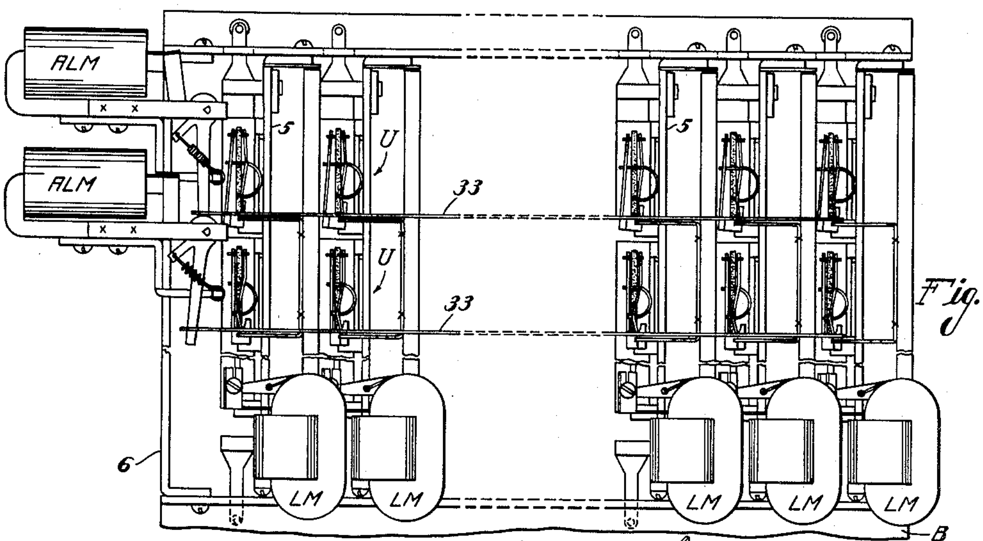
Figures 9, 10:
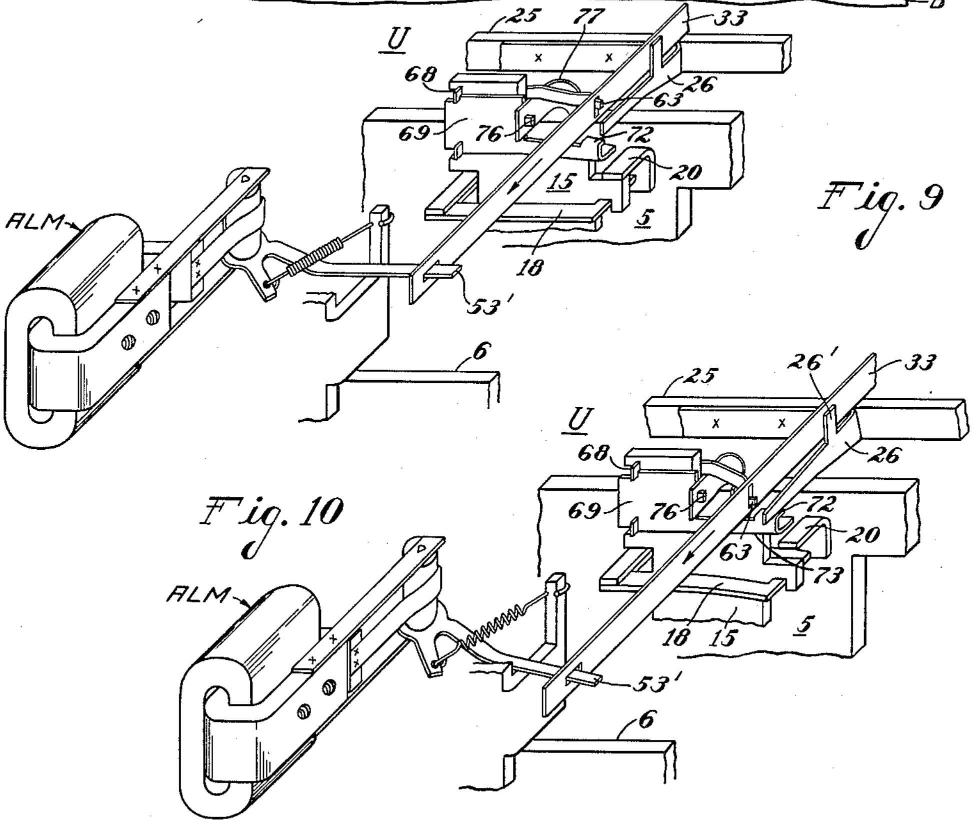

Fig. 8 is a plan view of a modified form;

Figs. 9 and 10 are perspective views in normal and operated positions respectively of modified allotting;

Fig. 11 is an exploded view of a map unit for use therewith; and

Figure 12:
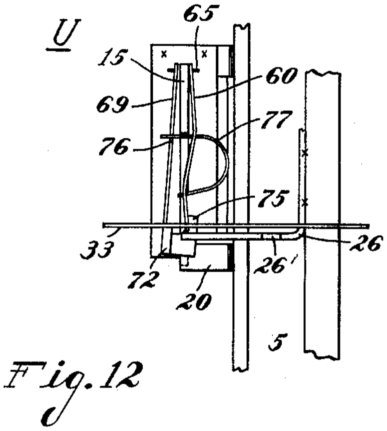
Figure 13:
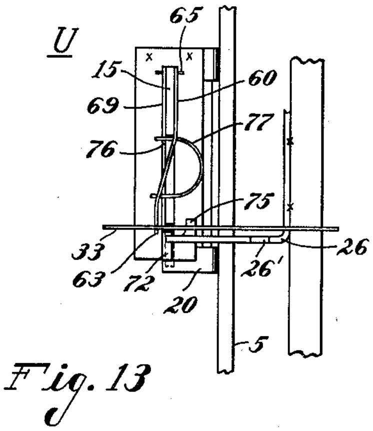

Figs. 12 and 13 are plan views of this unit in their normal and operated positions respectively.

The present coordinate switch has wide application wherever a plurality of lines or circuits are to be selectively connected to a plurality of other lines or circuits. Although not limited thereto, the switch of this invention is particularly adapted for use in various types of telephone systems wherein it is desired to connect calling telephone lines to links or to connect links to other links or to connect links to wanted telephone lines.

Figure 1:
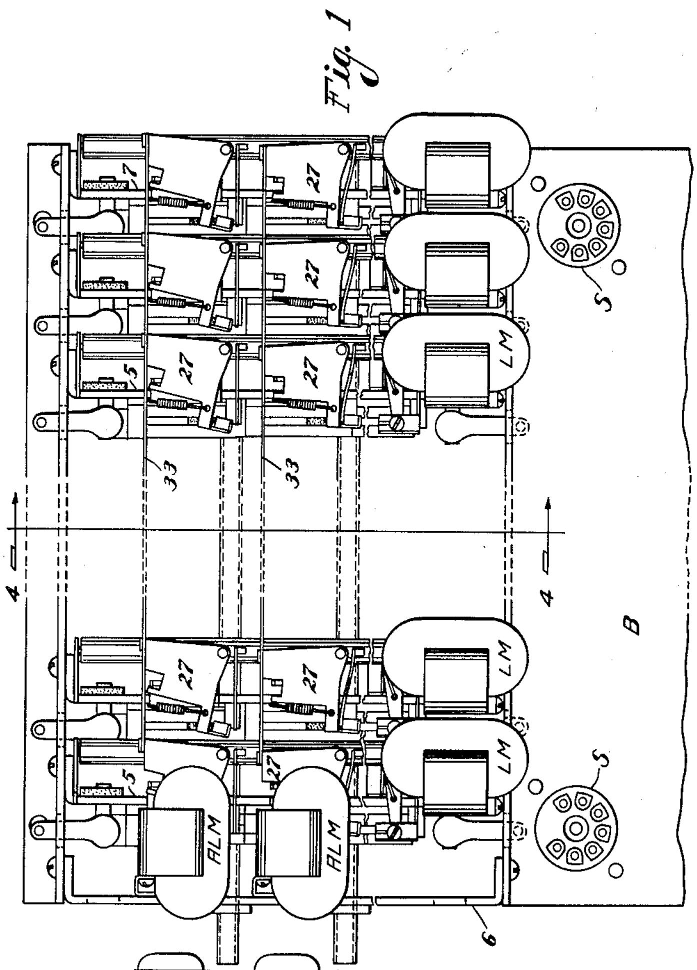
Fig. 1 is a front elevation of the switch of the present invention with certain parts thereof omitted in order to simplify the disclosure.

As herein illustrated, the switch is arranged for use in a relatively small telephone system and is adapted to interconnect twenty-five telephone lines with five finder link circuits and with five related connector link circuits although it will be understood that the number of lines and the number of links in this switch can be varied to meet operating conditions. In the present arrangement, therefore, twenty-five line plates, designated 5, are provided, of which only five line plates are shown in Fig. 1, the remainder of these plates being omitted to simplify the drawings. These line plates are mounted in spaced parallel relation being secured at their ends on the frame plates 6 and 7. Each line plate, as shown in Fig. 4, carries a set of three spaced electrically conducting parallel line or connecting strips 8, 9 and 10 arranged in a superimposed row and corresponding respectively to the hold, tip, and ring conductors of a telephone line. Ten sets of link or connecting bars such as 11, 12 and 13 arranged in superimposed rows, extend at right angles to the twenty-five sets of line strips, to cooperate therewith. It will be understood that the number of line or connecting strips in a set and the number of cooperating link or connecting bars in a set comprising a row, can be increased to six or more depending on the switching requirements to be satisfied by the switch.

Each line strip has portions thereof struck-out and formed with upstanding loops 14 (Fig. 5), one of which is provided at the point where a strip crosses each bar. Each loop 14 together with a limited portion of its line strip is movable up and down by means of a pusher 15 of insulating material having spaced lugs 16 and 17 to receive therebetween the loop which is supported on the lug 17. It will be understood that each pusher has three or more sets of lugs 16 and 17 to receive and simultaneously operate the related loops 14 of the set of three or more line strips such as 8, 9 and 10. It should be mentioned that each line strip is sufficiently flexible so that a portion thereof adjacent an operated pusher can be forced downward to make contact with a given link bar without causing substantial deflection of the remaining portion of the strip. Each pusher is supported on sets of spaced cantilever springs 18 (Figs. 4 and 5) carried on a bracket plate such as 19, which, in turn, is mounted on the line plate. These springs tend to hold the pusher 15 in its normal position against the fixed stop 20 (Fig. 5) on bracket 19, thereby insuring that each line strip is normally supported at a plurality of points on the several pushers, in a given plane, without any substantial sagging along its length.

Each line plate of the twenty-five parallel line plates, has ten transverse windows 22 therein. Each window is covered by a sheet of rigid insulation 23 riveted to the plate and having three openings 24 therein arranged in a transverse row, the corresponding rows in the several line plates being in alinement. A row or set of three link bars corresponding to a single link, respectively extend through the twenty-five sets of alined openings 24 in the insulation covering the windows in the line plates, each link bar being supported on the insulation at an opening 24 therein, directly below the point where a line strip crosses it. Thus there are cross-overs for each link bar at each of the twenty-five sets of line strips.

Each link bar such as 11 (Fig. 5) is channel-shaped comprising a web 11*a* and two side flanges 11*b*, which rest on the insulation at each opening 24. The web of the link bar at each of its related openings, has portions thereof struck out to provide a pair of elongated resilient fingers 11*c* and 11*c* directed toward each other. Each finger has welded thereto, a transversely extending bar contactor 11*d* of suitable contact metal to cooperate with a metal bar contactor, such as 8*a* welded to its related line strip 8 to extend transversely thereof. Thus when a line strip is depressed in the manner to be described, the contactor thereon engages the twin contactors on a pair of spring fingers on a link bar. These fingers can bend independently of each other to afford twin contact action.

In order to operate selectively the ten pushers 15 on each line plate, the line plate has rotatably mounted along one edge thereof, a rigid shaft 25 extending parallel to this edge. The shaft has secured thereto ten projecting fingers 26, one for each pusher 15, corresponding to each link. Each finger is made of sheet material that is substantially rigid in the direction of its principal plane, so that it is not distorted when it is presented edgewise to the end of its pusher. However the free end portion of the finger can be deflected laterally from its normal arc of travel, whereby as the deflected finger swings, its free end engages the end of the pusher to move the pusher 15 until its related line contactor 8*a* engages the related link contactors 11*c*, with ample contact force. A line magnet LM and related means individual to each line shaft, rocks this shaft against the action of a restoring spring 56 (Fig. 5) so that the fingers 26 thereon rotate through given or normal arcs of travel in which they do not operate their related pushers unless deflected to a second arc of travel.

In the switch of the present invention, an idle link comprising a set of finder link bars and a set of connector link bars such as 11, 12 and 13, are preferably allotted or preselected for the use of any one of the twenty five lines. The means for allotting a set of link bars includes a deflecting member 27 individual to each finger 26, the member being pivotally mounted on the bracket 19 of its related line plate, to rotate in a direction perpendicular to the principal plane of the finger. A spring 28 normally holds the deflecting member 27 against a fixed stop 29. The member has an angular arm 30 carrying a deflector 31 with inner and outer inclined surfaces along which, when operated, the free end of its related finger 26, can slide. The twenty-five deflecting members 27 individual to a given link bar are connected together by a metal tape 33 (Fig. 5) which is drawn in the direction of the arrow by an allotter magnet ALM on energization thereof. When the tape is drawn in the mentioned direction, each of its deflecting members 27 will rotate in a counterclockwise direction to position its deflector 31 in the path of rotation of its related finger 26. Thus, if a finger is now rotated, its free end will engage the inner inclined surface of its deflector 31, which deflects the end portion of the finger into contact with its related pusher 15. Further rotation of the finger depresses this pusher. Frictional engagement of the deflected end of the finger 26 is maintained as long as the line magnet LM remains energized even though the actuated allotter magnet ALM releases in the meantime. The remaining fingers 26 on the shaft 25 will also be depressed without engaging their respective pushers. However if a deflecting member 27 of another link is displaced into the return path of one of these last named fingers, the free end of the finger during the restoration thereof will slide back to its normal position along the outer inclined surface of its deflector 31.

The portion of the switch thus far described, is suitable for general switching purposes. When however it is to be used in a telephone system, such as is disclosed in applicant's companion application, Serial No. 326,112, filed December 15, 1952, it is desirable to provide mechanism effective when a line is in use to cut off the call-initiating equipment of that line, which equipment is similar in function to the conventional line relay and cut-off relay of a line. This mechanism comprises a pusher 15A (Fig. 5) mounted for operation in a manner similar to that of the pushers 15 already described. In this instance, the connecting strips 9 and 10 corresponding to the tip and ring conductors of a telephone line, are supported on and terminate at the pusher 15A. The terminating end of each of these strips is provided with a transverse contactor 35 of suitable contact metal. Each contactor 35 is normally in engagement with the twin contactors 36 carried on the resilient, forked end of a related line terminal 37 connected to one side of a telephone line. However, the connecting strip 8 while supported on the pusher 15A, is permanently secured to the flexible arms 38 of terminal 39 corresponding to the hold or sleeve conductor of a telephone line. The terminals 37 and 39 may be suitably mounted on a strip of insulation 40 which, in turn, is carried on a line plate. Thus, when a telephone line has originated a call or is called and its line magnet LM is operated, the call initiating equipment of the line is cut-off and the connection is held over strip 8. The pusher 15A is depressed by its related line magnet LM at the same time that this magnet rotates the shaft 25, to depress a pusher 15 for connecting a calling line strip to an allotted link bar.

The line magnet LM and its related means for operating the shaft 25 and pusher 15A may be constructed in various ways but the novel design herein disclosed, is preferred. This magnet comprises a U-shaped iron bar 45 on one of the legs 45A of which a magnetizing coil 46 is mounted (Fig. 6). An armature 47 is pivoted on leaf hinges to the other leg 45B of the bar, and has a length to bridge the free ends of the two legs thereby completing the magnetic circuit of the magnet. This magnet has an exceedingly narrow air gap so that the magnet develops large force without the use of an abnormal amount of power. Due to the extremely narrow air gap of the magnet, the armature 47 has a very small movement. It therefore, becomes necessary to multiply this movement, in order to satisfactorily opeerate the parts actuated by the magnet LM. This multiplication of movement is effected in the following manner. A stub shaft 48*a* preferably in axial alinement with shaft 25 is mounted for rocking movement in the spaced supports 49 carried by the leg 45A. The ends 50 of the shaft 48*a* are made with knife edges which engage V-shaped bearings in the free ends of the supports 49. A metal tape 51 has one of its ends welded to armature 47 and has its other end partially wrapped around the shaft 48*a* to which it is welded. The shaft has secured thereto a radial arm 53 which is provided with an angular extension 54. This arrangement is such that a relative small movement of the armature is translated into a relative large movement of the arm 53 and its extension 54. The extension projects in operative relation to the end of pusher 15A so that when the magnet LM is energized, the extension will depress this pusher.

It has been mentioned that the magnet LM also rotates the shaft 25. This is preferably effected in the manner best shown in Fig. 5. The shaft 25 has a radial arm 55 projecting into the path of movement of the extension 54 to be swung thereby. A spring 56 attached to bracket 57 and to arm 55, normally biases this arm to rest against stop 58. The bracket and the stop may be integral with a member 59 carried on its related line plate. A set screw 54′ threaded into the extension 54 against arm 55 on the shaft 25 permits adjustment of the amount of rotation of shaft 25 which is caused by the stub shaft 48*a*.

The allotter magnet is preferably of the same construction as the line magnet LM. However, the corresponding radial arm like 53 now functions to draw the tape 33 endwise whereby the attached deflecting members 27 are moved in a counterclockwise direction.

Figure 2:
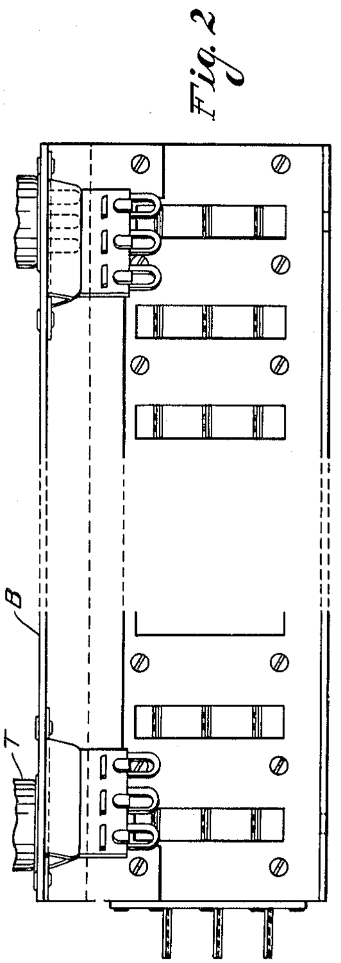
Fig. 2 is a bottom view and Fig. 3 is an end view of the switch.
Figure 3:
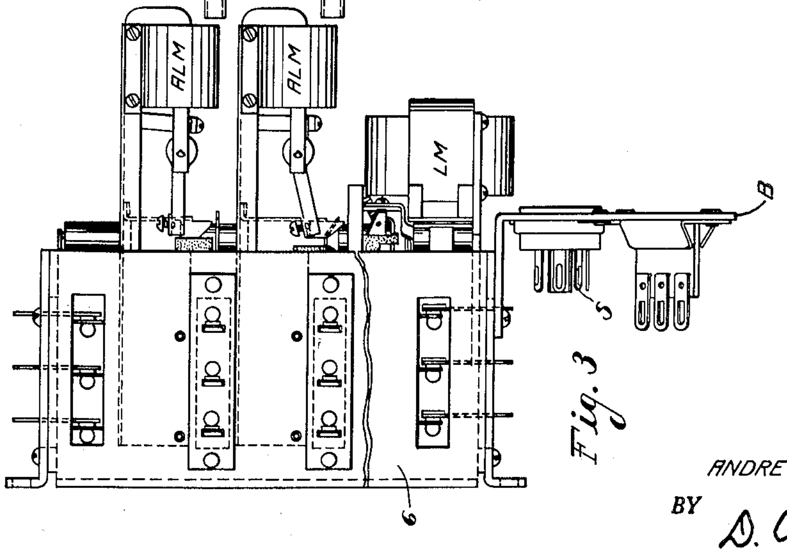

As shown in Figs. 1, 2 and 3, the frame of the switch has secured thereto a bracket B having sockets S to receive cold cathode tubes T. These tubes may be used to control the operation of the line magnet LM as disclosed in the mentioned application about to be filed.

In the operation of the present switch a set of link or connecting bars such as 11, 12 and 13, is always allotted in readiness for use in extending a calling line. Let it be assumed that the link illustrated in Fig. 5 has been so allotted. Under this assumption the allotter magnet ALM (not shown in Fig. 5) draws the tape 33 in the direction of the arrow. This operation moves all of the deflecting members 27 which are individual to the link, to the position shown in Fig. 5. When a line originates a call, its line magnet LM will be operated to rock the shaft 25 so that its projecting finger 26 engages the deflector 31. In the course of the downward movement of the finger 26 the free end thereof will engage the deflector 31 on the member 27, and will thus be deflected toward the left (Fig. 5) to engage the top of the pusher. This moves the pusher 15 to force the contacts on the respective strips into engagement with the respective line bars. When the allotter magnet is released a spring such as 28 will restore the several deflecting members 27 of a link into engagement with their respective stops 29. The line magnet of the calling line when energized also operates the pusher 15A to disconnect the call initiating equipment which functions for the same purpose as the line relay of conventional lines. This pusher and its related mechanism eliminate the need for the conventional cut-off relays.

The allotting means of the switch just described as well as the mechanism for selectively operating the several pushers, can be modified as shown in Figs. 8, 9, 10, 11, 12 and 13. In these views the line or connecting strips as well as the link or connecting bars have not been illustrated since these parts are unchanged. In this modification each rocking finger 26 is rigid and cooperates with a related snap-action unit U mounted on the upper end (Figs. 12 and 13) of its related pusher 15 to operate this pusher. This unit comprises a metal driving plate 60 (see also Fig. 11) provided with a driving arm 61 which in turn carries a downward extension 62. The right edge of the extension has a lug 63 adapted to project through an adjacent slot in the allotting tape 33. This tape is advanced by an arm 53' of the allotter magnet ALM. The left edge of the extension is provided with a lug 64 for a purpose to be described. The plate 60 is hingedly mounted at the rear left corner of the pusher 15 by means of a U-shaped retainer 65 which engages notches 60' in plate 50 and notches 66 in the left edge of the pusher. The retainer has opposed notches 67 in its spaced legs 68. The notches 67 receive the edges of the left end of the driven plate 69 and hingedly mount this plate against the left front corner of the pusher 15. It will be noted that the driven plate 69 by entering the notches in the retainer, locks the retainer in position on the pusher. The plate 69 has an integral driven arm 70 extending in the same direction as the driving arm 61. The right end of arm 70 is provided with an angular latch 72 adapted to move from its normal position (Fig. 12) out of the path of the rocking finger 26, to its actuated position (Fig. 13) where it is in the path of this finger. In this actuated position the lug 72 overlies the shoulder 73 on pusher 15, whereby the rocking motion of the finger 26 is communicated to the pusher to depress it and in turn the connecting strips supported thereon. The right end of arm 70 has an integral stop 75 which in its normal position limits the outward movement of the driven arm 70 away from the front surface of the pusher 15. The right edge of the plate 69 is provided with a lug 76. The lug 76 engages an opening in the left end of a toggle spring 77 while the mentioned lug 64 on the extension 62 of the driving arm 61, engages an opening in the right end of toggle spring 77. Thus when the tape 33 draws the driving arm 61 toward the rear surface of the pusher, during the allotting of a link, the toggle spring 77 is placed under increasing tension while the pressure against driven arm 70 diminishes until at a point beyond dead center, the driven arm snaps against the front of the pusher to bring the angular latch 72 into the path of the finger 26. The parts of the snap-acting unit tend to "stay-put" in the last position until the allotter magnet ALM releases, at which time the tape 33 draws the driving arm toward the rear whereupon the unit snaps to its alternate or normal position. In this position, the latch 72 is out of the path of rotation of the finger 26. It will be seen that a post 26' on each finger 26, engages the surface of the tape 33 to hold this tape on the lug 63 of the related latch unit.

The operation of this modified switch aside from the operation of the modified allotting mechanism, is similar to that already described and need not be repeated.

What I claim is:

1. In an interconnecting electrical switch, a plurality of spaced parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, a pusher of insulating material at each point of crossing having a lug normally supporting a line strip out of engagement with a link bar, a rotatable shaft extending parallel to each strip and having secured thereto a projecting finger individual to each pusher of its related line strip, each finger being substantially rigid in the direction of its arc of travel and being normally out of engagement with its related pusher during said travel, said finger being resilient for deflection out of its normal arc of travel into a second arc of travel into engagement with its related pusher, means to deflect one of the fingers on a given shaft into its second arc of travel, and means for rotating said last mentioned shaft whereby its deflected finger operates its related pusher to deflect a portion of its related strip into electrical engagement with a bar at a point of crossing without substantially deflecting other portions of said strip at its other points of crossing.

2. In an interconnecting electrical switch, a plurality of spaced parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, a pusher of insulating material at each point of crossing having a lug normally supporting a strip out of engagement with a bar, a rotatable shaft extending parallel to each line strip and having secured thereto a projecting finger individual to each bar and individual to each pusher of its related strip, each finger being substantially rigid in the direction of its arc of travel and being normally out of engagement with its related pusher during said travel, said finger being resilient for deflection out of its normal arc of travel into a second arc of travel into engagement with its related pusher, a deflector for each finger and individual to a bar, said deflector being movable to an operated position to divert its related finger into its second arc of travel on the rotation thereof, means for moving the deflectors individual to a given bar into their operated position whereby a bar is allotted for use, and means for rotating the shaft of a strip whereby its deflected finger operates its related pusher to deflect a portion of its related strip into electrical engagement with an allotted bar at a point of crossing without substantially deflecting other portions of said strip at its other points of crossing.

3. In an interconnecting electrical switch, a plurality of spaced parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, a pusher of insulating material at each point of crossing having a lug normally supporting a line strip out of engagement with a link bar, a rotatable shaft extending parallel to each strip and having secured thereto a projecting finger individual to each pusher of its related line strip, each finger being substantially rigid in the direction of its arc of travel and being normally out of engagement with its related pusher during said travel, said finger being resilient for deflection out of its normal arc of travel into a second arc of travel into engagement with its related pusher, mechanism individual to each bar and positionable to deflect the fingers individual to a bar on the rotation of any of said fingers whereby said rotated finger is deflected into its second arc of travel, means for allotting a bar and its related mechanism for use, and means for rotating the shaft of one of said last mentioned fingers whereby it is deflected to operate its related pusher to force a portion of its related strip into electrical engagement with the allotted bar at a point of crossing without substantially deflecting other portions of said strip at its other points of crossing.

4. In an interconnecting electrical switch, a plurality of spaced parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, a pusher of insulating material at each point of crossing having a lug normally supporting a line strip out of engagement with a link bar, a rotatable shaft extending parallel to each strip and having secured thereto a projecting finger individual to each bar and individual to each pusher of its related strip, each finger being substantially rigid in the direction of its arc of travel and being normally out of engagement with its related pusher during said travel, said finger being resilient for deflection out of its normal arc of travel into a second arc of travel into engagement with its related pusher, a deflector for each finger and individual to a bar, said deflector being movable to an operated position to divert its related finger into its second arc of travel on the rotation thereof, means including a tape connecting the deflectors individual to a bar for moving these deflectors into their operated position whereby a bar is allotted for use, means for rotating the shaft of a strip whereby its deflected finger operates its related pusher to deflect a portion of its related strip into electrical engagement with an allotted bar at a point of crossing without substantially deflecting other portions of said strip at its other points of crossing.

5. In an interconnecting electrical switch, a plurality of straight spaced parallel line strips made of resilient electrically-conducting material extending generally in a common plane, a plurality of parallel rigid link bars made of electrically conducting material, said bars being rigidly supported to lie generally in a plane parallel to but slightly spaced from said first plane and to extend in a direction to cross said line strips, a pusher of insulating material at each point of crossing having a lug normally supporting the body of a line strip out of engagement with a link bar, a movable member extending parallel to each line strip and having secured thereto a rigid projecting finger individual to each pusher of its related line strip, each finger during advancing movement thereof being out of engagement with its related pusher, means for moving said member and its fingers, a latch unit individual to each pusher, said unit including a latch adjacent its pusher, said latch being movable from a position out of the path of its related finger to an operated position wherein it is interposed between its related finger and pusher whereby they are advanced together to move a related portion of a line strip into engagement with a link bar, and means common to a link bar for operating the latch units individual thereto.

6. In an interconnecting electrical switch, a plurality of spaced parallel line strips made of resilient electrically-conducting material extending generally in a common plane, a plurality of parallel rigid link bars made of electrically conducting material, said bars being rigidly supported to lie generally in a plane parallel to but slightly spaced from said first plane and to extend in a direction to cross said line strips, a pusher of insulating material at each point of crossing having a lug normally supporting a line strip out of engagement with a link bar, a rotatable shaft extending parallel to each line strip and having secured thereto a rigid projecting finger individual to each pusher of its related line strip, each finger during rotation thereof being out of engagement with its related pusher, means for rotating said shaft, a latch unit individual to each pusher, said unit including a latch carried by its pusher, said latch being movable from a position out of the path of its related finger to an operated position wherein it is in the path of the advancing finger whereby this finger transmits motion to its related pusher, and means common to a link bar for operating the latch units individual thereto.

7. In an interconnecting electrical switch, a plurality of spaced parallel line strips made of resilient electrically-conducting material extending generally in a common plane, a plurality of parallel rigid link bars made of electrically conducting material, said bars being rigidly supported to lie generally in a plane parallel to but slightly spaced from said first plane and to extend in a direction to cross said line strips, a movable pusher of insulating material at each point of crossing having a lug normally supporting a line strip out of engagement with a link bar, a movable member extending parallel to each line strip and having secured thereto a rigid projecting finger individual to each pusher of its related line strip, each finger during advancing movement thereof being out of engagement with its related pusher, a latch unit secured to each pusher, said unit including a latch movable from a position out of the path of its related finger to an operated position wherein it is in the path of this finger whereby this finger transmits motion to its related pusher, means including a toggle spring in each latch unit for moving its latch to either of its positions, and means common to a link bar for operating the toggle springs individual thereto.

8. In an interconnecting electrical switch, a plurality of spaced, substantially straight, parallel connecting strips made of resilient electrically-conducting material extending generally in a common plane, each connecting strip being movable in a direction transversely thereof, a plurality of parallel substantially rigid connecting bars made of electrically conducting material, said bars being rigidly supported to lie generally in a plane parallel to but slightly spaced from said first plane and to extend in a direction to cross said strips, a pusher comprising insulating material at each point of crossing, the pushers individual to a given connecting strip normally serving to maintain said given strip in said common plane, and means to operate a pusher to deflect a portion of its line strip into electrical engagement with a bar at a point of crossing, the unoperated pushers of said last-mentioned line strip substantially preventing deflection thereof at its other points of crossing.

9. In an interconnecting electrical switch, a plurality of spaced parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, spring-restored pushers individual to a given connecting strip at each point of crossing, each pusher individual to a given connecting strip having means maintaining a portion of the given connecting strip out of engagement with the bars at the crossing points, and means to operate a pusher to deflect a portion of its strip into electrical engagement with a bar at a point of crossing, the unoperated pushers of the given connecting strip being the sole means of preventing deflection of the other portions of the given strip into engagement with bars at other points of crossing.

10. In an interconnecting electrical switch, a plurality of speed parallel connecting strips made of resilient electrically-conducting material extending generally in a common plane, a plurality of parallel rigid connecting bars made of electrically conducting material, said bars being rigidly supported to lie generally in a plane parallel to but slightly spaced from said first plane and to extend in a direction to cross said strips, spring-restored pushers of insulating material individual to a given connecting strip at each point of crossing, fixed stop means engaged by each pusher in its normal restored position, each pusher individual to a given connecting strip having a lug maintaining a portion of the given connecting strip out of engagement with the bars at the crossing points, means to operate a pusher to deflect a portion of its strip into electrical engagement with a bar at a point of crossing, the unoperated pushers of the given connecting strip being the sole means of preventing deflection of the other portions of given strip into engagement with bars at other points of crossing, and means for allotting for use the pushers individual to a given bar.

11. In an interconnecting electrical switch, a plurality of spaced parallel connecting strips made of flat resilient electrically-conducting material extending generally in a common plane, said strips being movable throughout the major portions of their lengths in a direction perpendicular to their flat surfaces, a plurality of parallel rigid connecting bars made of electrically conducting material, said bars being rigidly supported to lie generally in a plane parallel to but slightly spaced from said first plane and to extend in a direction to cross said strips, each bar at each point of crossing having an elongated spring finger rigidly fixed at one end to the bar and extending along the principal axis thereof, a contactor welded on each finger near its free end, a bar contactor welded to the strip at each point of crossing with a bar and in registering relation to the contactor on the related finger, a pusher comprising insulating material at each point of crossing, and means to operate a pusher to deflect a contactor on a strip into electrical engagement with a contactor on the finger of the bar at a point of crossing, the unoperated pushers of the given connecting strip being the sole means of preventing deflection of the other portions of given strip into engagement with bars at other points of crossing.

12. In an interconnecting electrical switch, a plurality of spaced parallel connecting strips made of resilient electrically-conducting material extending generally in a common plane, said strips being movable throughout the major portions of their lengths in a direction perpendicular to their flat surfaces, a plurality of parallel rigid connecting bars made of electrically conducting material, said bars being rigidly supported to lie generally in a plane parallel to but slightly spaced from said first plane and to extend in a direction to cross said strips, each bar at each point of crossing having a pair of opposed spring fingers partially struck from within the body of the bar and extending along the principal axis thereof, a pusher of insulating material at each point of crossing, and means to operate a pusher to deflect a portion of a strip into electrical engagement with a pair of fingers of a bar at a point of crossing, the unoperated pushers of the given connecting strip being the sole means of preventing deflection of the other portions of given strip into engagement with bars at other points of crossing.

13. In an interconnecting electrical switch, a plurality of spaced parallel connecting strips made of flexible electically-conducting material extending generally in a common plane, said strips being movable throughout the major portions of their lengths in a direction perpendicular to their flat surfaces, a plurality of parallel rigid connecting bars made of electrically conducting material, said bars being rigidly supported to lie generally in a plane parallel to but slightly spaced from said first plane and to extend in a direction to cross said strips, each bar at each point of crossing having a pair of opposed spring fingers partially struck from within the bar and extending along the principal axis thereof, a bar contactor secured on each finger near its free end and extending transversely thereof, a bar contactor secured to the strip and extending transversely thereof at each point of crossing with a bar and in operative relation to the related contactors on said fingers, a pusher of insulating material at each point of crossing, said pushers having a normal position in a plane parallel to said planes, and means to operate said pushers selectively, the unoperated pushers of a given line strip being the sole means for substantially preventing deflection of remaining portions of the fine strip at other points of crossing.

14. In an interconnecting electrical switch, a plurality of spaced, straight parallel connecting strip members made of resilient electrically-conducting material extending generally in a common plane, said strip members movable throughout the major portions of their lengths in a direction perpendicular to their flat surfaces, a plurality of parallel rigid connecting bar members made of electrically conducting material, said bar members being rigidly supported to lie generally in a plane parallel to but slightly spaced from said first plane and to extend in a direction to cross said strip members, a pusher of insulating material at each point of crossing, each pusher being spring restored to a given normal position and having a lug supporting a portion of a strip member out of engagement with the bar member at the crossing point, means to operate a pusher to deflect a portion of a strip member into electrical engagement with a bar member at a point of crossing without substantially deflecting other portions of said strip member at its other points of crossing, the unoperated pushers of a given connecting strip member being the sole means for substantially preventing deflection of remaining portions of the connecting strip member at other points of crossing and means for allotting one of said members for use.

15. In an interconnecting electrical switch, a plurality of spaced, straight parallel connecting strips made of resilient electrically-conducting material extending generally in a common plane, said strips being movable throughout the major portions of their lengths in a direction perpendicular to their flat surfaces, a plurality of parallel rigid connecting bars made of electrically conducting material, said bars being rigidly and insulatedly supported to lie generally in a plane parallel to but slightly spaced from said first plane and to extend in a direction to cross said strips, a pusher comprising insulating material at each point of crossing, each pusher being spring-restored to a given normal position and having a lug supporting a portion of a strip out of engagement with the bar at the crossing point, means to operate an allotted pusher to deflect a portion of a strip into electrical engagement with a bar at a point of crossing without substantially deflecting other portions of said connecting strip at its other points of crossing, the unoperated pushers of a given line strip being the sole means for substantially preventing deflection of remaining portions of the connecting strip at other points of crossing, and means to allot a pusher for use.

16. In an interconnecting electrical switch, a primary set of spaced parallel flat connecting strips made of resilient electrically conducting material extending generally in a common plane, said strips being bodily movable throughout the major portions of their lengths in a direction perpendicular to their flat surfaces, a primary set of parallel rigid connecting bars made of electrically conducting material, said bars being rigidly supported to lie generally in a plane parallel to but slightly spaced from said first plane and to extend in a direction to cross said strips, a secondary set of parallel connecting strips made of flexible electrically-conducting material and a secondary set of rigid connecting bars related thereto, said secondary sets of strips and bars being mounted in parallel planes similar to the mounting of the primary sets in superimposed relation thereto with the related cross points of the primary and secondary sets in registry, a pusher comprising insulating material common to each of the registering points of crossing, and means to operate a pusher to deflect a portion of a primary strip and a secondary strip respectively into electrical engagement with a primary bar and a secondary bar at the registering points of crossing, the unoperated pushers individual to a given primary strip and related secondary strip being the sole means for preventing deflection of other portions of said strips at their other points of crossing.

17. In an interconnecting electrical switch, a plurality of spaced parallel line strips made of resilient electrically-conducting material extending generally in a common plane, a plurality of parallel rigid link bars made of electrically conducting material, said bars being rigidly supported to lie generally in a plane parallel to but slightly spaced from said first plane and to extend in a direction to cross said line strips, a movable pusher comprising insulating material at each point of crossing having a lug normally supporting a line strip out of engagement with a link bar, the pushers individual to a line strip being the sole support of the major portion of the line strip, a movable member extending parallel to each line strip and having secured thereto a rigid finger individual to each pusher of its related line strip, each finger at the limit of its advancing movement being out of engagement with its related pusher, means for moving said member and its fingers, a unit individual to each pusher, said unit being movable from a position out of the path of its related finger to an operated position wherein it is interposed between its related finger and pusher whereby they are advanced together, and means common to a link bar for operating the units individual thereto.

18. In an interconnecting switch, a plurality of plates mounted in fixed parallel planes, each plate having spaced openings therein arranged in a common plane and alined with the openings in the other plates, electrically conducting rigid bars extending through the respective alined openings and insulatedly supported therein, movable pushers mounted on each plate, each pusher being individual to each bar extending therethrough, means for selectively operating said pushers, fixed stop means in a plane parallel to said common plane, resilient means normally maintaining said pushers against said stop means, and a strip of resilient electrically conducting material individual to and extending in a direction parallel to each plate to cross over said bars, the pushers individual to a plate insulatedly supporting the individual strip thereof in a plane parallel to but in operative spaced relation to the common plane of said bars whereby the operation of a given pusher deflects a portion of its strip into electrical contact with a given bar at the point of crossover thereof, unoperated pushers individual to the last-mentioned strip serving as the sole means to maintain the remaining portions thereof out of engagement with the remaining bars.

19. In an interconnecting electrical switch, a plurality of spaced parallel line strips made of resilient electrically-conducting material extending generally in a common plane, a plurality of parallel rigid link bars made of electrically conducting material, said bars being rigidly supported to lie generally in a plane parallel to but slightly spaced from said first plane and to extend in a direction to cross said line strips, a movable pusher of insulating material at each point of crossing having a lug normally supporting a line strip out of engagement with a link bar, the pushers individual to a line strip being the sole support of the major portion of the line strip, a movable member extending parallel to each line strip and having secured thereto a rigid finger individual to each pusher of its related line strip, each finger at the limit of its advancing movement being out of engagement with its related pusher, means for moving said member and its fingers, a unit individual to each pusher, said unit being movable from a position out of the path of its related finger to an operated position wherein it is interposed between its related finger and pusher whereby they are advanced together, a tape individual to each bar for moving the units individual thereto into the path of the fingers also individual thereto, and means for operating an allotted tape.

20. In an interconnecting switch, a plurality of plates mounted in fixed parallel planes, each plate having spaced openings therein arranged in a common plane and alined with the openings in the other plates, electrically conducting rigid bars extending through the respective alined openings and insulatedly supported therein, a movable pusher mounted on each plate individual to each bar extending therethrough, movable means for operating said pushers including a finger individual to each pusher, fixed stop means in a plane parallel to said common plane, resilient means normally maintaining said pushers against said stop means, a strip of resilient electrically conducting material individual to and extending in a direction parallel to each plate to cross over said bars, the pushers individual to a plate insulatedly supporting the individual strip thereof in a plane parallel to but in operative spaced relation to the common plane of said bars whereby the operation of a given pusher deflects a portion of its strip into electrical contact with a given bar at the point of crossover thereof, unoperated pushers individual to the last-mentioned strip serving as the sole means to maintain the remaining portions thereof out of engagement with the remaining bars, an allotting tape individual to each bar and extending parallel thereto, means for operating a tape lengthwise, and means actuated by said operated tape for rendering an operated finger effective to move a selected pusher.

21. In an interconnecting electrical switch, a set of spaced parallel connecting members made of electrically-conducting material extending generally in a common plane, a set of parallel connecting bars made of electrically conducting material, said bars being rigidly supported to lie generally in a plane parallel to but slightly spaced from said first plane and to extend in a direction to cross said members, a pair of normally-closed cut-off contacts connected to each member of a set, a movable pusher comprising insulating material at each point of crossing, each pusher serving when operated to connect a portion of a member into electrical engagement with a bar at a point of crossing, an actuator individual to a pair of cut-off contacts and common to a group of pushers, said actuator when operated serving to open its individual cut-off contacts, and means including a magnet for simultaneously operating a pusher and an actuator common thereto.

22. In an interconnecting electrical switch, a set of spaced parallel connecting strip members made of electrically-conducting material extending generally in a common plane, a set of parallel connecting bar members made of electrically conducting material, said bar members being rigidly supported to lie generally in a plane parallel to but slightly spaced from said first plane and to extend in a direction to cross said strip members, a pair of normally closed cut-off contacts connected to each member of one of said sets, a pusher when operated serving to connect a portion of a strip member into electrical engagement with a bar member at a point of crossing, an actuator individual to a pair of cut-off contacts and common to a group of pushers, said actuator when operated serving to open its individual cut-off contacts, and means for simultaneously operating a pusher and an actuator common thereto.

References Cited in the file of this patent

UNITED STATES PATENTS

| | | |
|---|---|---|
| 1,563,658 | Richard | Dec. 1, 1925 |
| 2,447,010 | Harrison | Aug. 17, 1948 |
| 2,517,022 | Peek | Aug. 1, 1950 |
| 2,519,849 | Ostline | Aug. 22, 1950 |
| 2,577,067 | Arthur | Dec. 4, 1951 |
| 2,577,468 | Knos | Dec. 4, 1951 |
| 2,615,095 | Graybill | Oct. 21, 1952 |